1

3,268,506
POLYGLYCOL AZO ESTER POLYMERIZATION INITIATORS
Louis de Vries, Richmond, Calif., assignor to Chevron Research Company, a corporation of Delaware
No Drawing. Filed Sept. 9, 1963, Ser. No. 307,305
2 Claims. (Cl. 260—192)

This invention relates to novel polymerization initiators and to their preparation. Particularly it concerns the preparation and composition of polyglycol azo esters.

Azo compounds of the general formula $$R-N=N-R$$

wherein R represents hydrocarbon groups, have been used as polymerization catalysts. It is believed they enhance polymerization by means of a free radical mechanism. Upon heating, the azo group, —N=N—, is released as nitrogen gas leaving the two R· free radicals. These radicals may then attack monomers in the usual fashion to produce polymer chains.

In the manner described above, the novel polymerization initiators of the present invention may be used to induce polymerization of unsaturated compounds, such as ethylenically unsaturated monomers, vinyl monomers, vinyl chlorides and the alkyl esters of $\alpha,\beta$-unsaturated monocarboxylic acids. But initiation of conventional polymerizations is not the only function of the novel azo compounds of the instant invention. Unlike the azo compounds of the prior art, the new compounds contain polyglycol groups. That is to say, in the new compounds the R hydrocarbon group described above would consist mainly of a polyglycol constituent. Consequently, in addition to polymerization initiation, these new azo compounds may be used to supply polyglycol groups in copolymerizations in which incorporation of polyglycol groups in the copolymer is desirable. Examples of such copolymerizations are those which produce ashless detergent lubricating oil additives consisting of polymers of the above-mentioned monomers having polyglycol end groups. In these copolymers, the polyglycol portion supplies the polarity necessary to increase the detergent characteristics of the composition. These azo compounds are particularly suitable for forming ashless detergent additive copolymers having a block-type structure.

The novel polyglycol azo ester polymerization initiators of the instant invention may be prepared by reacting under anhydrous conditions an aliphatic azo compound of the formula

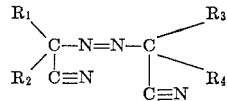

wherein $R_1$, $R_2$, $R_3$ and $R_4$ represent alkyl radicals with a polyalkylene glycol in the presence of HCl to form an imido ester hydrochloride; and hydrolyzing the imido ester hydrochloride to obtain a polyglycol azo ester polymerization initiator of the general formula

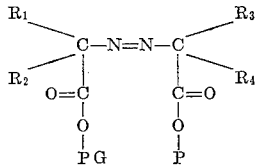

wherein $R_1$, $R_2$, $R_3$ and $R_4$ represent alkyl radicals and PG represents a polyglycol group.

Suitable aliphatic azo compound reactants are those having bonded to each nitrogen atom of the azo group a tertiary carbon atom to which is bonded one nitrile group, respectively. The remaining valences of the tertiary carbon atom are exclusively satisfied by alkyl groups, $R_1$, $R_2$, $R_3$ and $R_4$ in the above formulae, having from 1 to 7 carbon atoms, such as the methyl, ethyl, propyl, butyl, isopropyl, isobutyl, t-butyl, 2-methylpentyl, hexyl, and heptyl groups. Particularly preferred are those azo compounds which are symmetrical and have lower alkyl straight-chain groups attached to the teritary carbon atoms. Examples of preferred species are azodiisobutyronitrile, $\alpha,\alpha'$-azobis($\alpha$-dimethylbutyronitrile), $\alpha,\alpha$-azobis($\alpha$-methylbutyronitrile), and $\alpha,\alpha'$-azobis($\alpha$-ethylbutyronitrile).

Suitable polyalkylene glycol reactants are poly-1,2-alkylene glycols and their monoalkyl ethers, said ethers having from 1 to 18 carbon atoms in the alkyl group, both glycol and ether having from about 2 to about 500 alkylene units (PG in the above formula). Particularly suitable are polyethylene glycols having from about 40 to about 500 alkylene units. Examples of the preferred species are polyethylene glycols having average molecular weights from 1500 to 50,000. Such glycols may be obtained by polymerizing 1,2-alkylene oxides or mixtures thereof in the presence of a catalyst and a suitable initiator for the reaction, such as water, monohydric alcohol in the case of alkyl ethers, mercaptans, and the like. These preparations are well known and therefore require no detailed description here.

The following example is illustrative of the invention.

*Example*

Into a flask is charged 224 g. of polyethylene glycol having a molecular weight of approximately 200 dissolved in 750 cc. of benzene. This mixture is refluxed to remove as much water as possible by such means and then dried further over calcium hydride overnight. The benzene solution is then filtered off the calcium hydride and added to 270 cc. of dry dioxane (dried by refluxing over sodium for 48 hours, followed by distillation), which contains 8.7 g. of azodiisobutyronitrile. The combined solutions are saturated with dry HCl gas at 0° C. and allowed to stand in a cold room at 0° C. for 5 days. The imido ester hydrochloride product is then precipitated by addition of pentane. The excess azodiisobutyronitrile remains in solution. The precipitate is redissolved in benzene and reprecipitated with pentane. The product is now dissolved in a small amount of dioxane and hydrolyzed by the addition of 10 cc. of water. The removal of the dioxane and water by freeze-drying yields the polyglycol azo ester product. The product is further purified as follows: the product is dissolved in acetone and the excess hydrochloric acid is precipitated with ammonia gas. The acetone solution is filtered off the ammonium chloride and the solvent is removed in a vacuum. The solid residue is dissolved in benzene and the pure initiator is obtained from this solution by freeze-drying.

A similar product is produced using a polyethylene glycol having a molecular weight of approximately 12,000.

The foregoing detailed description has been given for clearness of understanding only, and no unnecessary limitations are to be understood therefrom. The invention is not limited to the exact details or examples shown and

I claim:
1. A polyglycol azo ester polymerization initiator having the structural formula

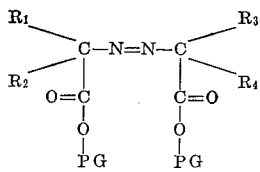

wherein $R_1$, $R_2$, $R_3$ and $R_4$ represent alkyl radicals having from 1 to about 7 carbon atoms and PG represents a polyalkylene glycol group having from about 40 to about 500 alkylene oxide units and from 2 to 3 carbon atoms in each of said units.

2. The composition of claim 1, wherein $R_1$, $R_2$, $R_3$ and $R_4$ are methyl radicals and PG is a polyethylene glycol group having from about 40 to about 500 ethylene oxide units.

References Cited by the Examiner

Migrdichian, The Chemistry of Organic Cyanogen Compounds, pages 84–86, 92, and 93 (1947).

CHARLES B. PARKER, *Primary Examiner.*

IRVING MARCUS, *Examiner.*

NORMA S. MILESTONE, *Assistant Examiner.*